United States Patent
Miyamoto

(10) Patent No.: US 7,432,929 B2
(45) Date of Patent: Oct. 7, 2008

(54) IMAGE PROCESSING APPARATUS AND IMAGE PROCESSING METHOD

(75) Inventor: Toshihiro Miyamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 11/275,687

(22) Filed: Jan. 24, 2006

(65) Prior Publication Data
US 2006/0171688 A1    Aug. 3, 2006

(30) Foreign Application Priority Data
Jan. 28, 2005    (JP) .............................. 2005-022083

(51) Int. Cl.
*G06T 15/00*    (2006.01)

(52) U.S. Cl. ........................ 345/473; 345/474; 345/475; 386/27; 386/68; 386/108

(58) Field of Classification Search ......... 345/473–475; 386/68–69, 109–112, 27–33
See application file for complete search history.

(56) References Cited

U.S. PATENT DOCUMENTS 6,185,363 B1 *    2/2001    Dimitrova et al. ............. 386/69
6,574,416 B1 *    6/2003    Posa et al. .................... 386/69

\* cited by examiner

*Primary Examiner*—Phu K Nguyen
(74) *Attorney, Agent, or Firm*—Fitzpatrick, Cella, Harper & Scinto

(57) ABSTRACT

A plurality of frame data are extracted from a moving image file included in at least one image file recorded in a recording device. In a case where a moving image file is selected from the image file, the extracted plurality of frame data are displayed on a display device, and in a case where a still image file is selected from the image file, the still image file is displayed on the display device.

14 Claims, 14 Drawing Sheets

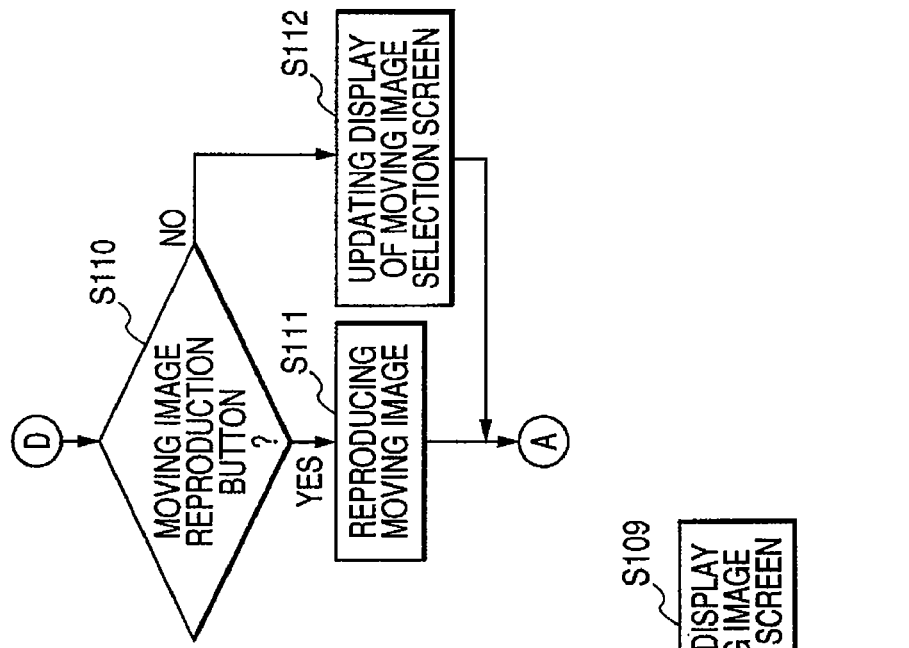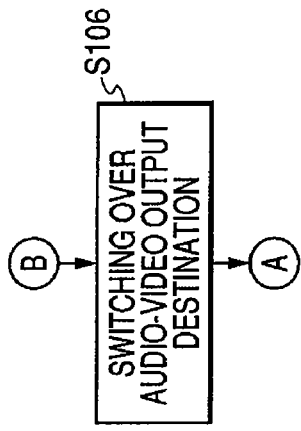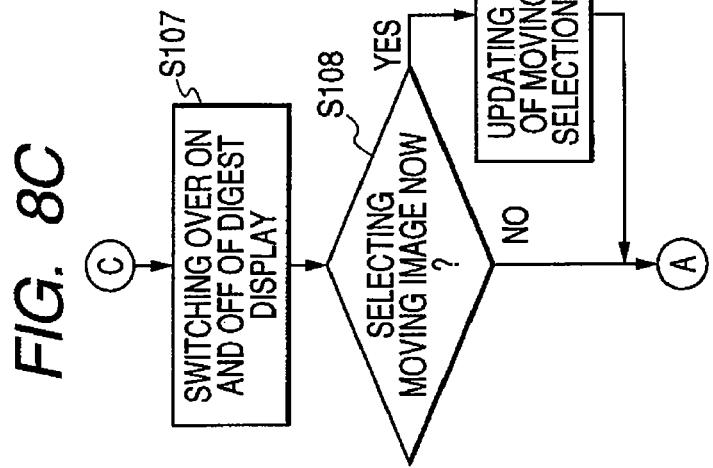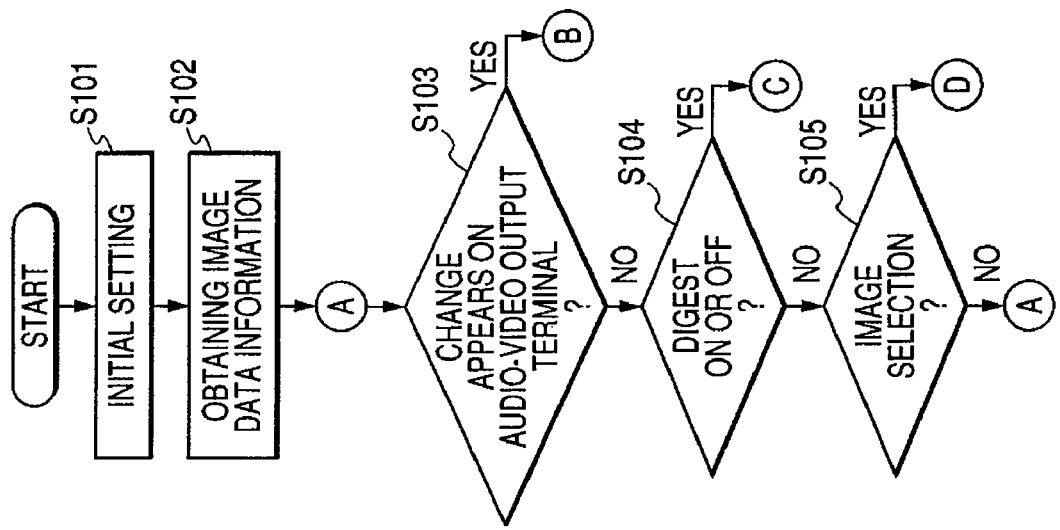

FIG. 12

WITHOUT DIGEST

*AVI
| HEADER |
| AUDIO #1 |
| IMAGE #1 |
| IMAGE #2 |
| IMAGE #3 |
| ... |
| AUDIO #2 |
| IMAGE #16 |
| IMAGE #17 |
| IMAGE #18 |
| ... |
| AUDIO #3 |
| IMAGE #31 |
| ⋮ |
| INDEX |

WITH DIGEST

*AVI
| HEADER |
| IMAGE #001 |
| IMAGE #101 |
| IMAGE #201 |
| IMAGE #301 |
| IMAGE #401 |
| IMAGE #501 |
| IMAGE #601 |
| IMAGE #701 |
| IMAGE #801 |
| AUDIO #1 |
| IMAGE #1 |
| IMAGE #2 |
| IMAGE #3 |
| ... |
| AUDIO #2 |
| IMAGE #16 |
| IMAGE #17 |
| IMAGE #18 |
| ... |
| AUDIO #3 |
| IMAGE #31 |
| ⋮ |
| INDEX |

IMAGE PROCESSING APPARATUS AND IMAGE PROCESSING METHOD

BACKGROUND OF THE INVENTION

1. Field of the Invention

The present invention relates to an image processing apparatus and an image processing method of processing a moving image file.

2. Related Background Art

Conventionally, moving image reproducing apparatuses capable of reproducing moving image data, using a memory card having a solid memory element as a recording medium, have already been on the market. In these moving image reproducing apparatuses, for selection of an image in the case of moving image data, a first frame thereof is displayed as an image representative of moving image data.

However, when a moving image is selected in the conventional moving image reproducing apparatus, if only a first frame is displayed contents of the moving image data cannot be grasped sufficiently, so that the contents of the moving image data cannot be confirmed until the moving image is reproduced.

SUMMARY OF THE INVENTION

The present invention has been made in order to solve the above-mentioned problem, and its object is to provide an image processing apparatus and an image processing method capable of grasping the contents of a moving image file more precisely.

As measures to achieve the above-mentioned object, according to an aspect of the present invention, an image processing apparatus comprising: a recording device for recording at least one image file; an extracting device for extracting a plurality of frame data from a moving image file contained in the image file; a selecting device capable of selecting an arbitrary image file from the image file; and a display control device for displaying the plurality of frame data extracted by the extracting device on a display device in a case where the moving image file is selected from the image file by the selecting device, and for displaying the still image file on the display device in a case where a still image file is selected from the image file by the selecting device.

The above-mentioned object of the present invention will become apparent from the following drawings and the detailed description based on the drawings.

BRIEF DESCRIPTION OF THE DRAWINGS

FIGS. 8A, 8B, 8C and 8D are flowcharts showing an operation of the moving image reproducing apparatus according to the first embodiment of the present invention;

FIG. 12 shows configurations of a moving image file containing no digest display data and a moving image file containing both moving image reproduction data and digest display data;

DESCRIPTION OF THE PREFERRED EMBODIMENTS

Hereinafter, preferable embodiments to which the present invention is applied will be described in detail with reference to the attached drawings.

First Embodiment

Figure 1:
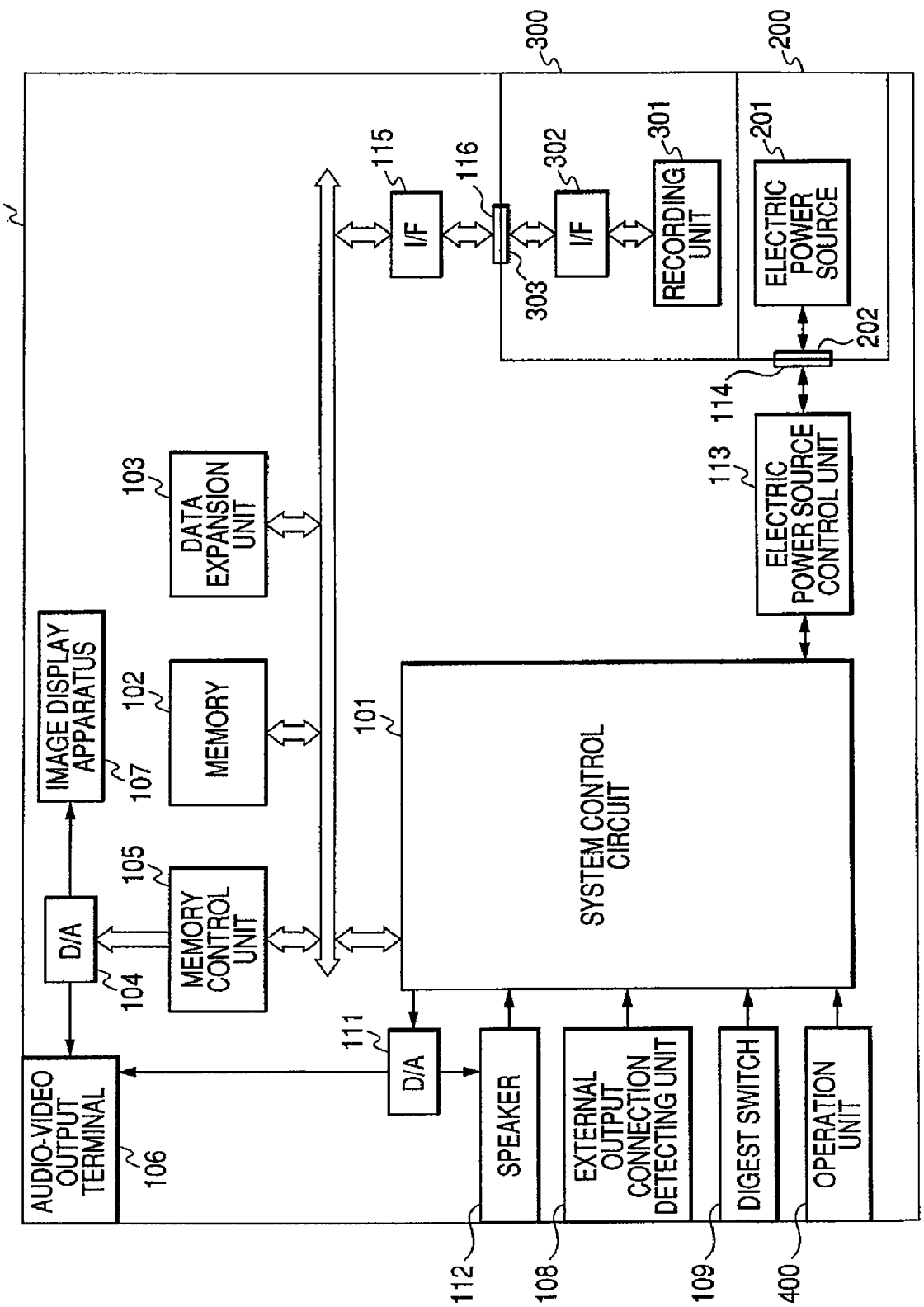
FIG. 1 shows a configuration of a moving image reproducing apparatus according to a first embodiment of the present invention.

FIG. 1 shows a configuration of a moving image reproducing apparatus according to the present embodiment. In FIG. 1, reference numeral 100 denotes a moving image reproducing apparatus, 101 denotes a system control circuit, 102 denotes a general-purpose volatile memory, and 103 denotes a data expansion unit for expanding compressed image data. Reference numeral 104 denotes an image D/A converter, which obtains video data of the volatile memory 102 via the memory control unit 105, and converts the video data to an analog signal for outputting a video signal from an audio-video output terminal 106 and an image display apparatus 107.

Reference numeral 108 denotes an external output connection detecting unit, which detects whether or not an external video display apparatus is connected to the audio-video output terminal 106. Reference numeral 109 denotes a digest switch for switching a display method at a time of selecting a moving image, and reference numeral 400 denotes an operation unit for selecting a display image.

Reference numeral 111 denotes an audio D/A converter, which converts audio data to an analog signal to be output from the audio-video output terminal 106 and a speaker 112. Reference numeral 113 denotes an electric power source control unit, which supplies a stable voltage from an electric power source unit 200 connected to a connector 114 and composed of an electric power source 201 and a connector 202, to a system control circuit 101.

Reference numeral 115 denotes a nonvolatile memory interface, which receives compressed image data from a nonvolatile memory 300 connected to a connector 116 and composed of a recording unit 301, an interface 302, and a connector 303.

Figure 2:
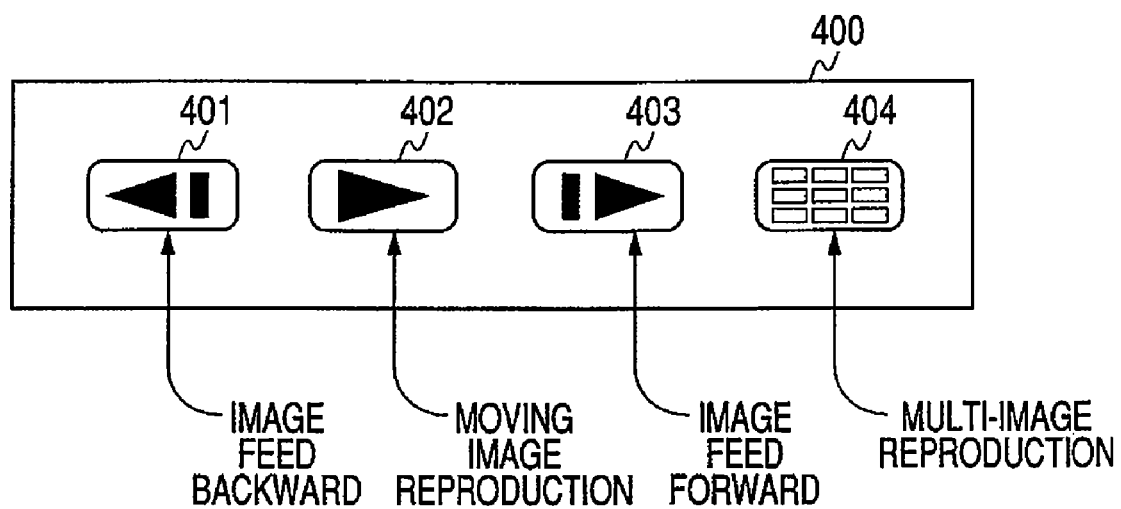
FIG. 2 shows an operation unit of the moving image reproducing apparatus.

FIG. 2 shows an operation unit 400 of the moving image reproducing apparatus 100. The operation unit 400 is composed of an image feed backward button 401 for feeding an image backward at a time of selecting an image, a moving image reproduction button 402 for starting the reproduction of a moving image at a time of moving image data, an image feed forward button 403 for feeding an image forward at a time of selecting an image, and a multi-image reproduction button 404 for displaying a plurality of image data on a screen concurrently.

Figure 3:
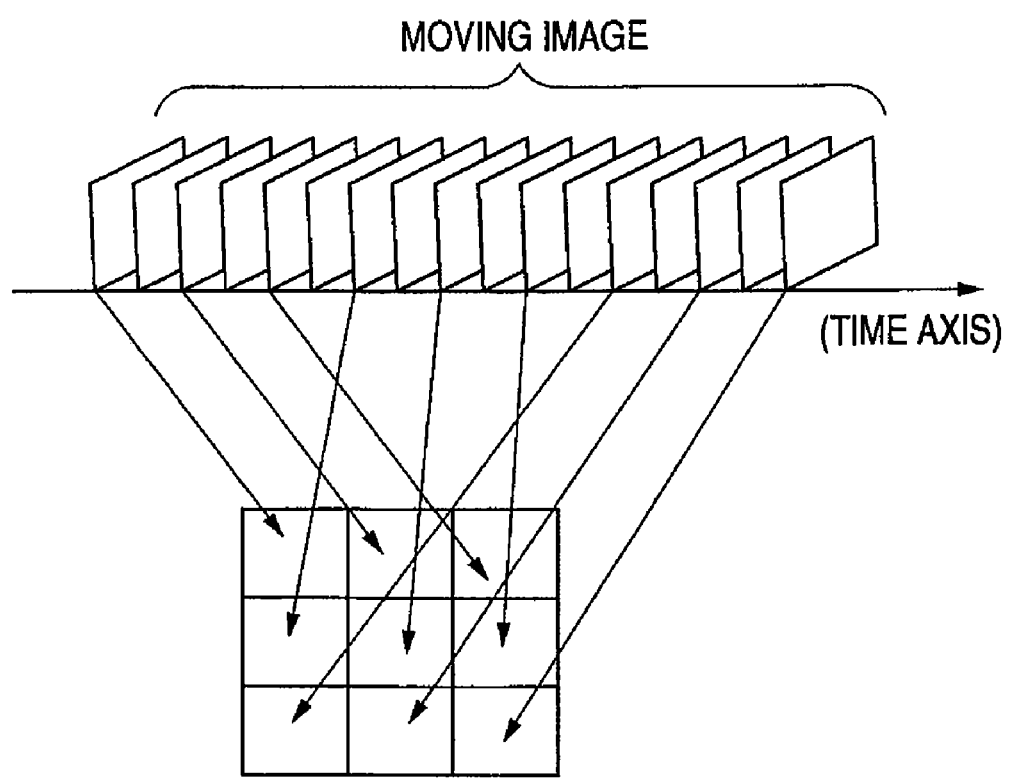
FIG. 3 schematically shows a relationship between a frame and a display position when a moving image is displayed in a digest format.

FIG. 3 schematically shows a relationship between a frame and a display position when the digest display of a moving image is performed. As shown in FIG. 3, several frames are extracted appropriately from a plurality of frames contained in a moving image and displayed on a screen concurrently.

Next, an operation of the present embodiment will be described with reference to FIGS. 4 to 8A to 8D. FIGS. 8A to 8D are flowcharts showing an operation of the moving image reproducing apparatus 100 of the present embodiment.

On power-up, the system control circuit 101 performs initial settings of a flag, a control variable, and the like (Step S101), and obtains image data information recorded in the nonvolatile memory 300 (Step S102).

In the case where the system control circuit 101 detects a change in the audio-video output terminal 106 by the external output connection detecting unit 108 (Step S103/YES), the processing proceeds to Step S106. In Step S106, if the external video display apparatus is connected to the audio-video output terminal 106, the outputs of the D/A converters 104 and 111 are input to the audio-video output terminal 106. Furthermore, if the external video display apparatus is not connected to the audio-video output terminal 106, the outputs of the D/A converters 104 and 111 are input to the image display apparatus 107 and the speaker 112.

In the case where the system control circuit 101 detects a change in an ON/OFF state of a digest switch 109 (Step S104/YES), the processing proceeds to Step S107. In Step S107, a display method at a time of a moving image is switched, and if a moving image is currently being selected (Step S108/YES), a screen on which the moving image is currently being displayed is updated (Step S109).

Figure 6:
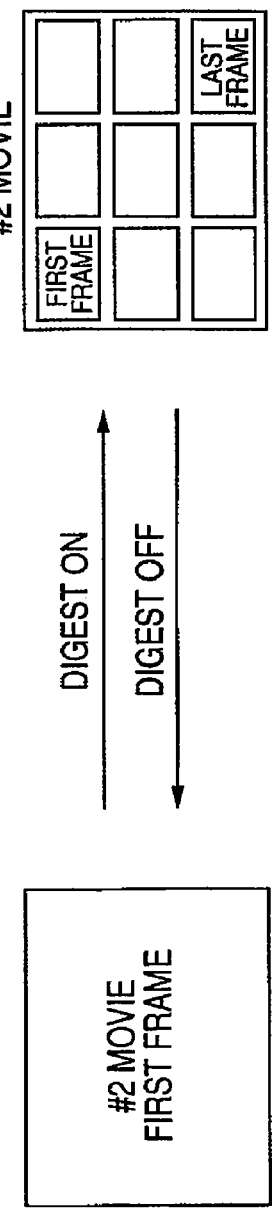
FIG. 6 shows a state of a change in a screen display involved in ON/OFF of a digest switch.

FIG. 6 shows a state of a change in a screen display involved in ON/OFF of the digest switch 109. A plurality of frames in a moving image are displayed on a screen concurrently when digest is turned on, and only a first frame of the moving image is displayed on the screen when digest is turned off.

In the case where the system control circuit 101 detects that an image is selected by the operation unit 400 (Step S105/YES), the processing proceeds to Step S110. In Step S110, if the moving image reproduction button 402 is depressed (Step S110/YES), a moving image is reproduced (Step S111). On the other hand, if the image feed backward button 401, the image feed forward button 403, and the multi-image reproduction button 404 are depressed (Step S105/NO), a display screen is updated in accordance with the buttons (Step S112).

Figure 4:
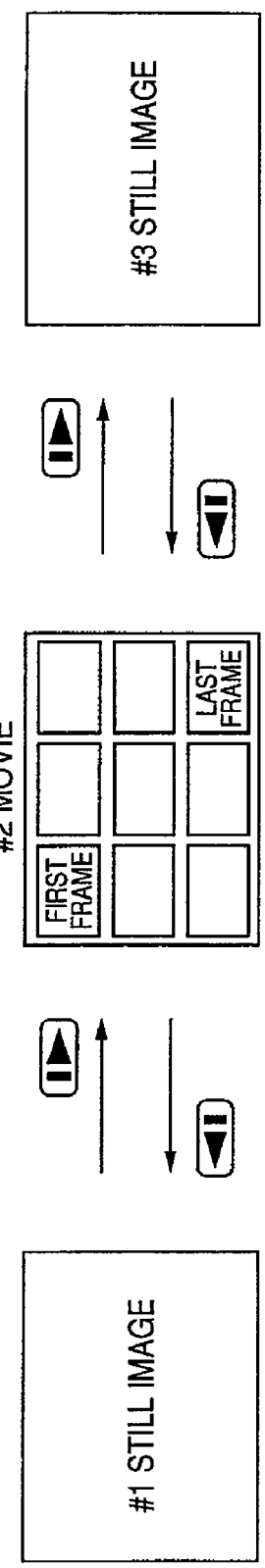
FIG. 4 shows a state of a change in a screen display involved in the operation of the operation unit.
Figure 5:
FIG. 5 shows a state of a change in a screen display involved in the operation of the operation unit.
Figure 7:
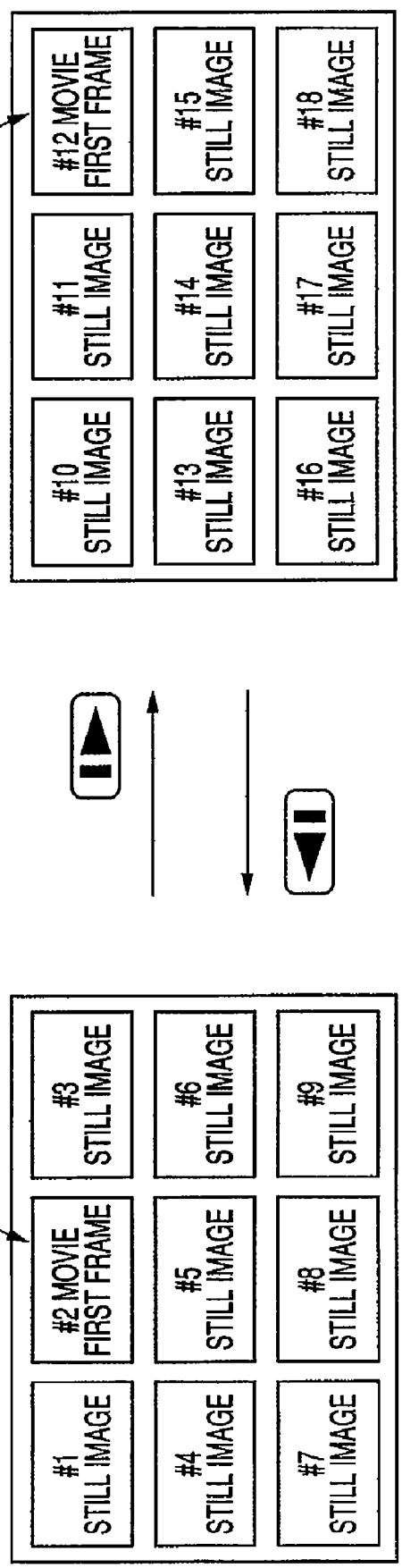
FIG. 7 shows a state of a change in a screen display involved in an operation of the operation unit.

FIGS. 4, 5, and 7 show a state of a change in a screen display involved in an operation of the operation unit 400.

When the digest switch 109 is in an ON state, images are fed forward one by one with the image feed backward button 401 and the image feed forward button 403. However, in the case of a moving image, digest display is performed as shown in FIG. 4. When the digest switch 109 is in an OFF state, a first frame is displayed as shown in FIG. 5 in the case of a moving image.

When the multi-image reproduction button 404 is depressed, a plurality of images are displayed on a screen concurrently. In this case, even if the digest switch 109 is in an ON state, moving image data displays only a first frame as shown in FIG. 7.

According to the present embodiment, when a moving image is selected, the outline of the moving image can be grasped at the stage of selecting an image.

Second Embodiment

Figure 9:
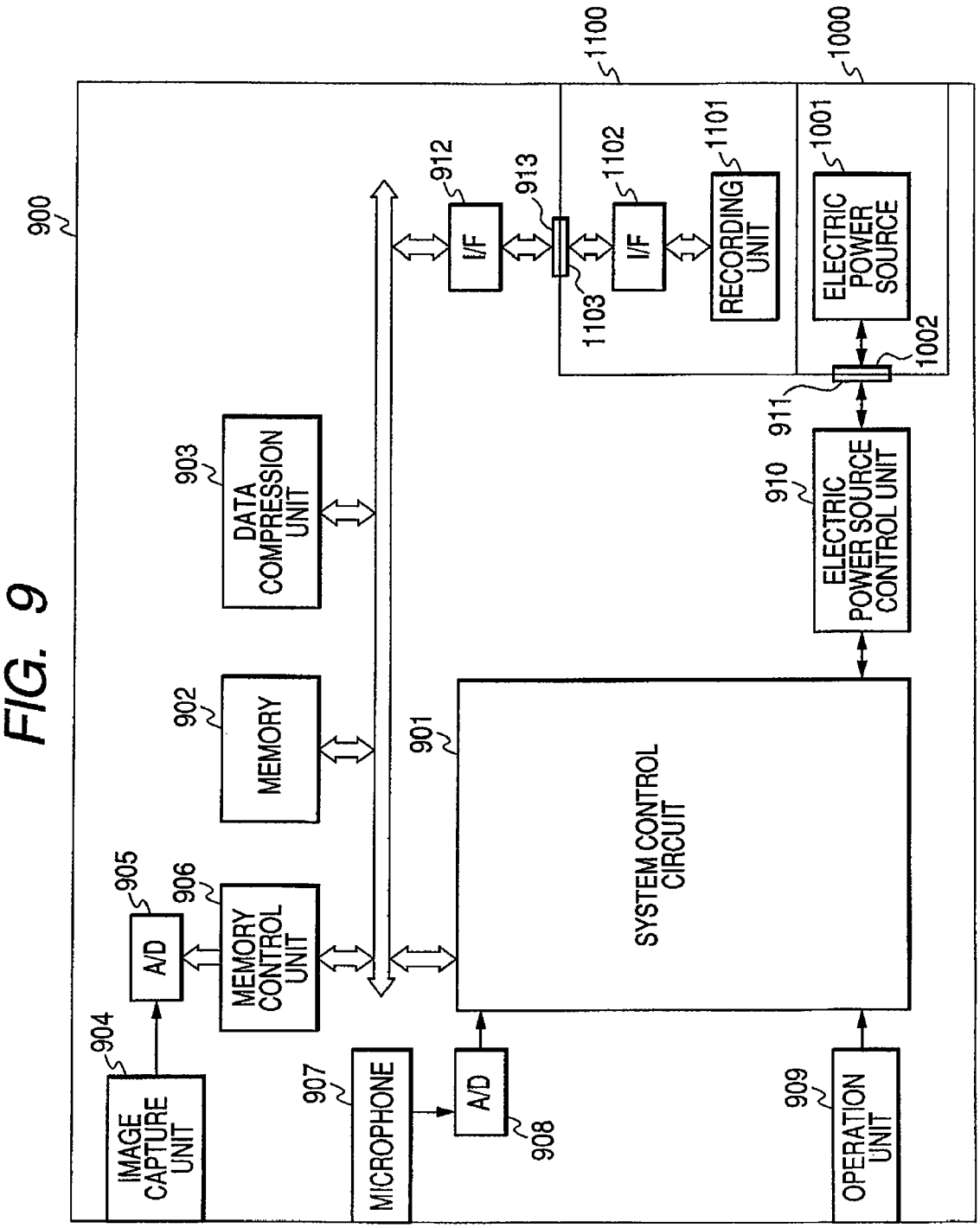
FIG. 9 shows a configuration of a moving image reproducing apparatus according to second to fourth embodiments of the present invention.

FIG. 9 shows a configuration of a moving image reproducing apparatus according to the present embodiment.

In FIG. 9, reference numeral 900 denotes a moving image reproducing apparatus. Reference numeral 901 denotes a system control circuit, 902 denotes a general-purpose volatile memory, and 903 denotes a data compression unit for compressing image data. Reference numeral 904 denotes an image capture unit. Analog image data obtained by the image capture unit 904 is converted into digital image data by the image A/D converter 905 and stored in the volatile memory 902 by the memory control unit 906.

Reference numeral 907 denotes a microphone. Analog audio data picked up by the microphone 907 is converted into digital audio data by the audio A/D converter 908 and input to the system control circuit 901.

Reference numeral 909 denotes an operation unit. The operation unit 909 is used for a user to instruct the moving image reproducing apparatus 900 that "moving image photographing is started/stopped" and "digest display data and moving image reproduction data are the same file/separate files".

Reference numeral 910 denotes an electric power source control unit, which supplies a stable voltage from an electric power source unit 1000 connected to a connector 911 and composed of an electric power source 1001 and a connector 1002, to the system control circuit 901. Reference numeral 912 denotes a nonvolatile memory/interface, which outputs compressed image data to the nonvolatile memory 1100 connected to a connector 913 and composed of a recording unit 1101, an interface 1102, and a connector 1103.

Figure 10:
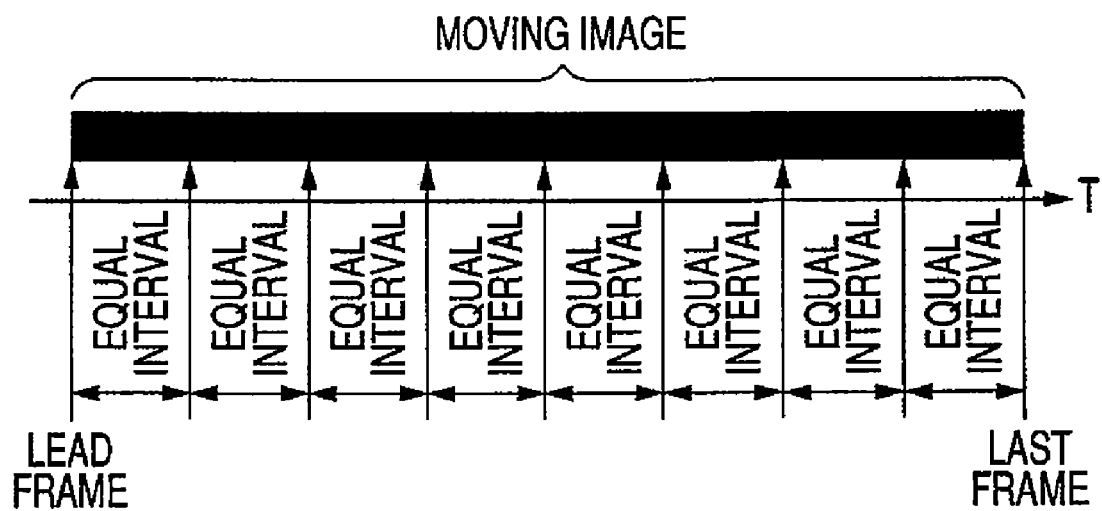
FIG. 10 shows an ideal digest image interval.

FIG. 10 shows an ideal digest image interval. In a relationship between the frame and the display apparatus shown in FIG. 3, ideally, it is desired to create a partition between a lead frame and a last frame at an equal interval, extract a digest image, and to display the digest image. A last frame number is determined at the end of photographing. Therefore, it is impossible to obtain digest image candidate data at an ideal interval during photographing.

Figure 11:
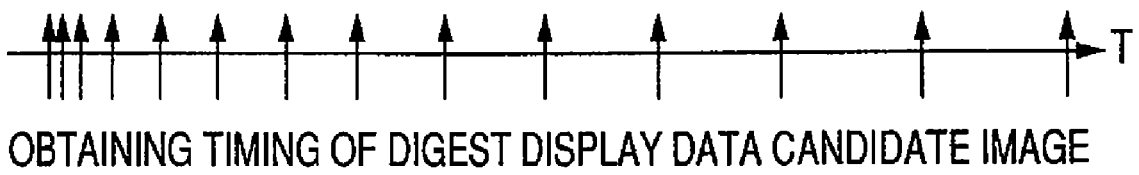
FIG. 11 shows an exemplary timing of obtaining a digest display data candidate image.

FIG. 11 shows an exemplary timing of obtaining a digest display data candidate image. As shown in FIG. 11, by enlarging the interval of an obtaining timing as a photographing time becomes longer, it is possible to make the obtaining timing close to an ideal digest image interval to some degree.

FIG. 12 shows configurations of a moving image file containing no digest display data, and a moving image file containing both moving image reproduction data and digest display data. In the moving image file containing no digest display data, digest display data is not present between a header portion containing moving image information and a moving image reproduction data portion. On the other hand, in the moving image file containing digest display data, digest display data is present between the header portion containing moving image information and the moving image reproduction data portion. The reason for such a configuration is that data whose position in a file is closer to a head thereof can be accessed faster in terms of the configuration of a file system.

Figure 13:
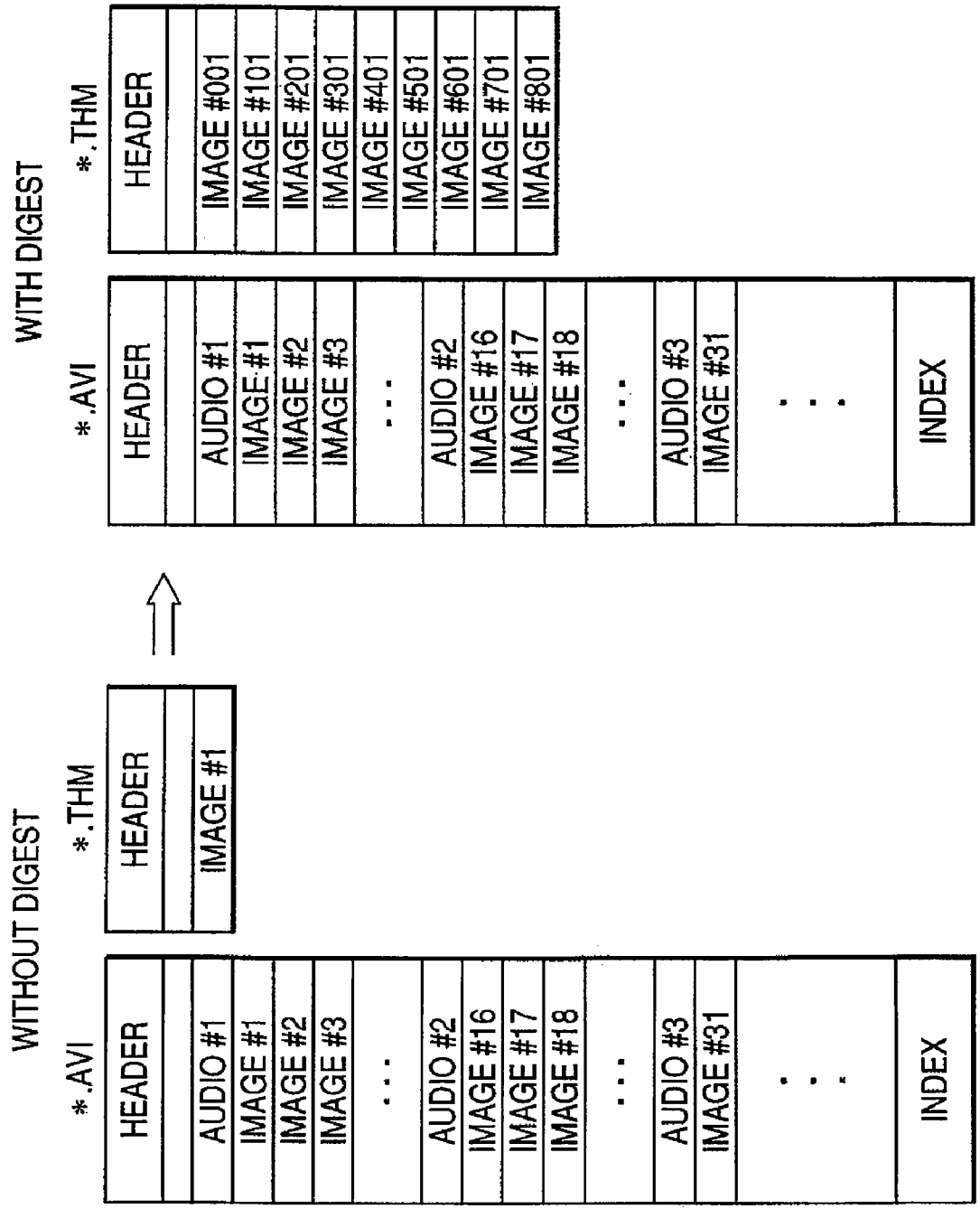
FIG. 13 shows a configuration of a moving image file in the case where moving image reproduction data and digest display data are of separate files.

FIG. 13 shows a configuration of a moving image file in which moving image reproduction data and digest display data are separate files. In the case of the moving image file containing no digest display data, only moving image information and a first frame of a moving image are present in a separate file. However, in the case of the moving image file containing digest display data, since digest display data is also present in a separate file. With such the configuration, digest display data is present in a separate file, even if a file containing moving image reproduction data becomes too large, a digest display time is not influenced. The examples shown in FIGS. 12 and 13 are file configurations also applicable to the above-mentioned first embodiment, and the third and fourth embodiments described later.

Figure 14:
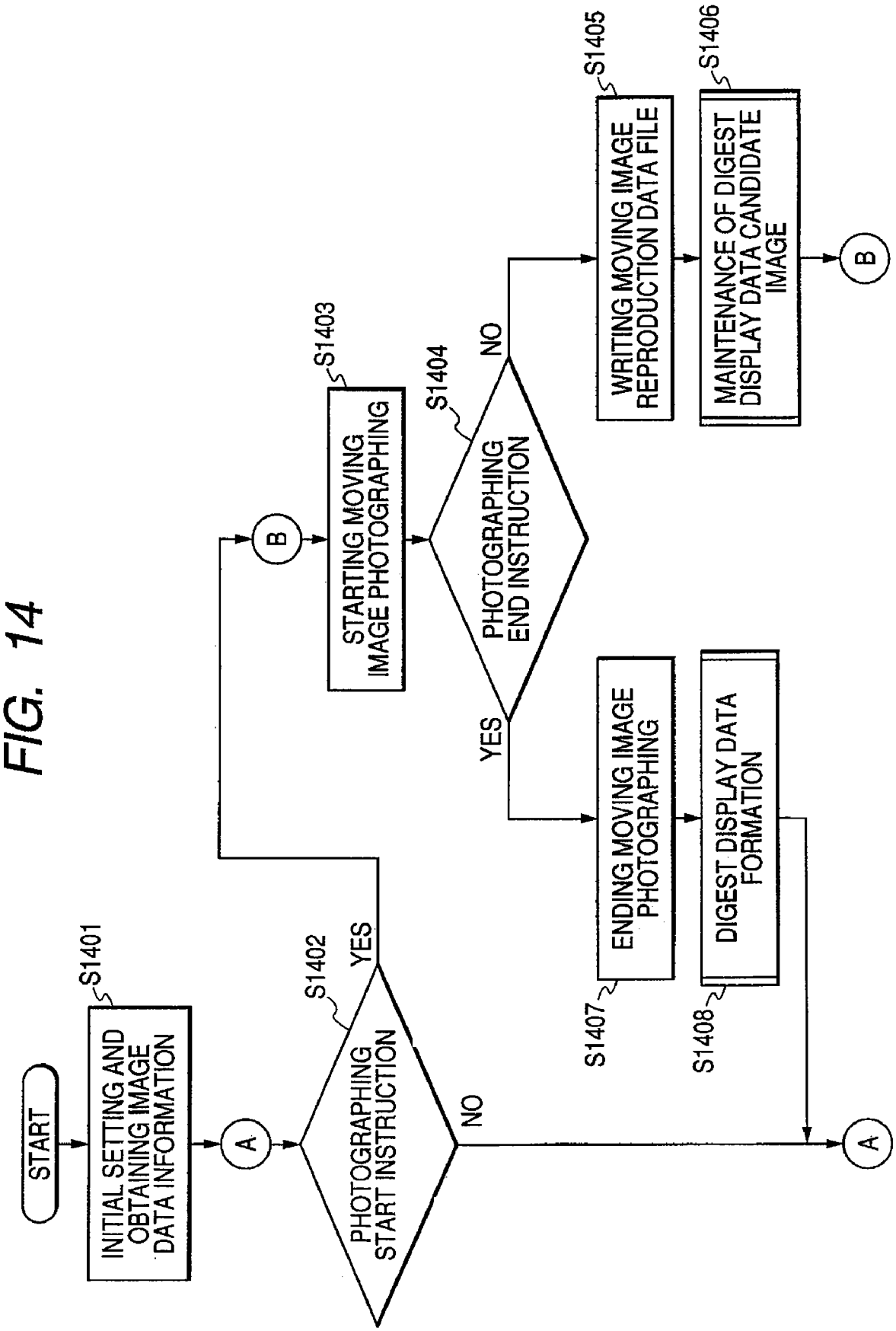
FIG. 14 is a flowchart showing an operation of the moving image reproducing apparatus according to the second embodiment of the present invention.

Next, an operation of the present embodiment will be described with reference to FIGS. 14 to 18. FIG. 14 is a flowchart showing an operation of the moving image reproducing apparatus 900 (see FIG. 9) of the present embodiment.

On power-up, the system control circuit 901 performs initial settings of a flag, a control variable, and the like (Step S1401), and obtains image data information recorded in the nonvolatile memory 1100. In the case where the system control circuit 901 detects a moving image photographing start instruction by the operation unit 909 (Step S1402/YES), moving image photographing is started (Step S1403). In the case where a moving image photographing end instruction is not instructed by the operation unit 909 (Step S1404/NO), image/audio data is obtained and moving image reproduction data is written in a file (Step S1405). Then, a digest display data candidate image is maintained (Step S1406). A method of writing moving image reproduction data in a file will be described later with reference to FIG. 15, and a method of maintaining a candidate image will be described later with reference to FIG. 17.

In the case where a moving image photographing end is instructed by the operation unit 909 (Step S1404/YES), moving image photographing is ended (Step S1407). Then, digest display data is created and written in a file (Step S1408), and the process proceeds to Step S1402 to go into a standby state of moving image photographing start instruction. A method of creating digest display data will be described later with reference to FIGS. 16 and 18.

Figure 15:
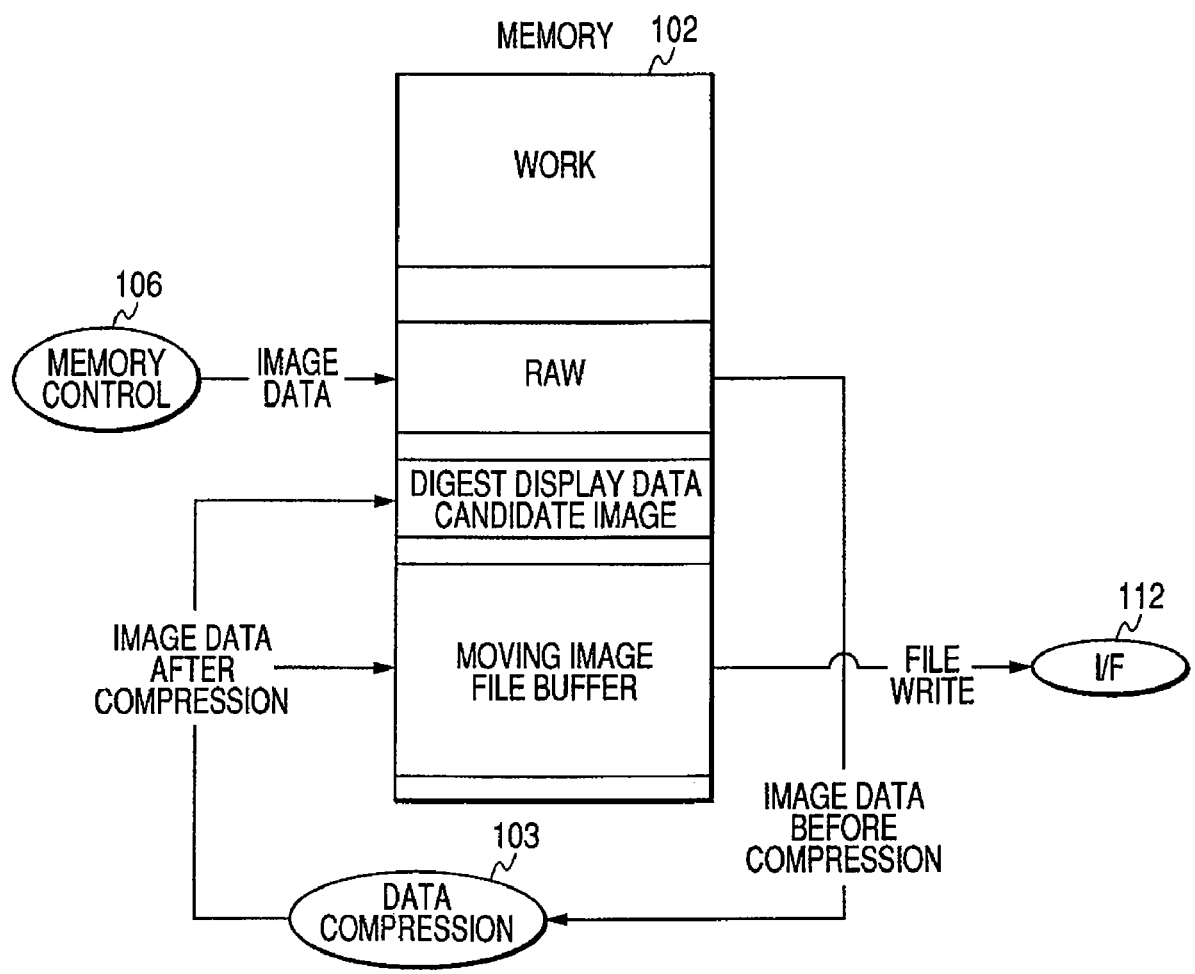
FIG. 15 illustrates a method of writing moving image reproduction data in a file.

FIG. 15 shows a memory map in a moving image reproduction data creating sequence (Step S1405). FIG. 15 shows a state in which data obtained from the memory control unit 906 once enters an RAW region to be compressed through the data compression unit 903, and the compressed data is stored in a file buffer, and thereafter, the compressed data is written in a nonvolatile memory by an I/F 912. In the case of a candidate image obtaining timing, the compressed data is also placed in a digest display data candidate image region at the same time when it is stored in a file buffer.

Figure 16:
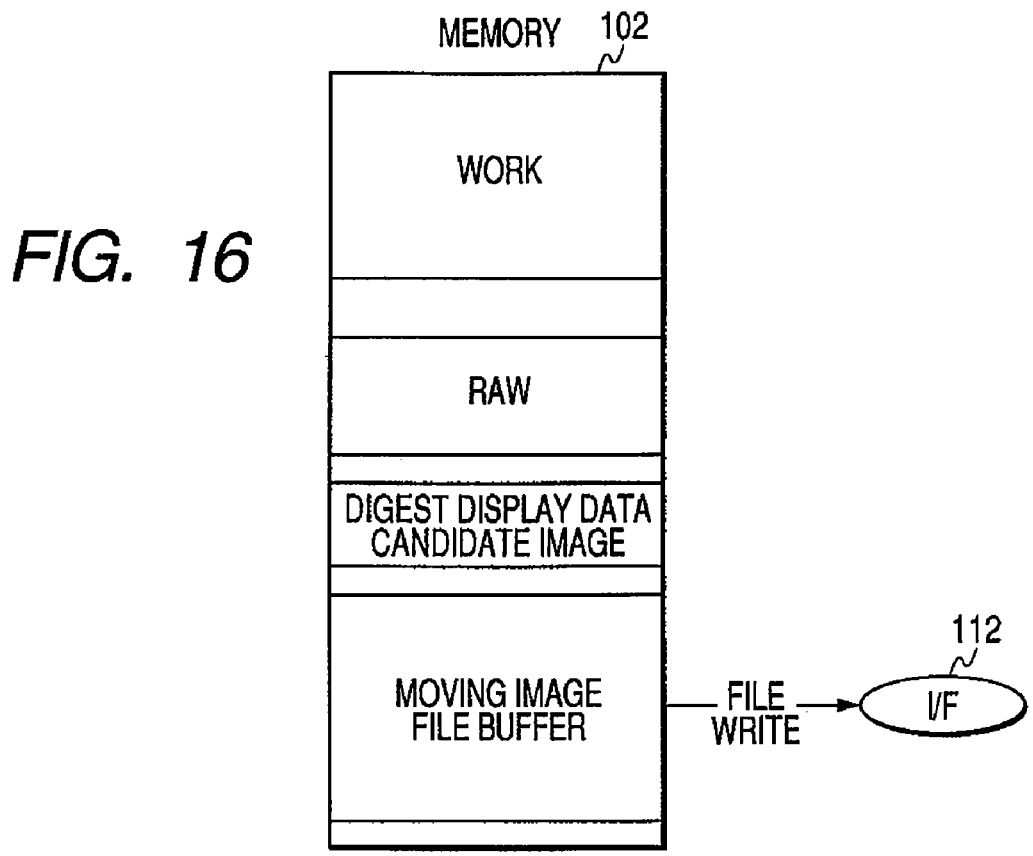
FIG. 16 shows a memory map in a sequence for creating digest display data (Step S1408)

FIG. 16 shows a memory map in a digest display data creating sequence (Step S1408). FIG. 16 shows a state in which digest display data is selected and created from a candidate image region held during moving image photographing is written in a nonvolatile memory by the I/F 912.

Figure 17:
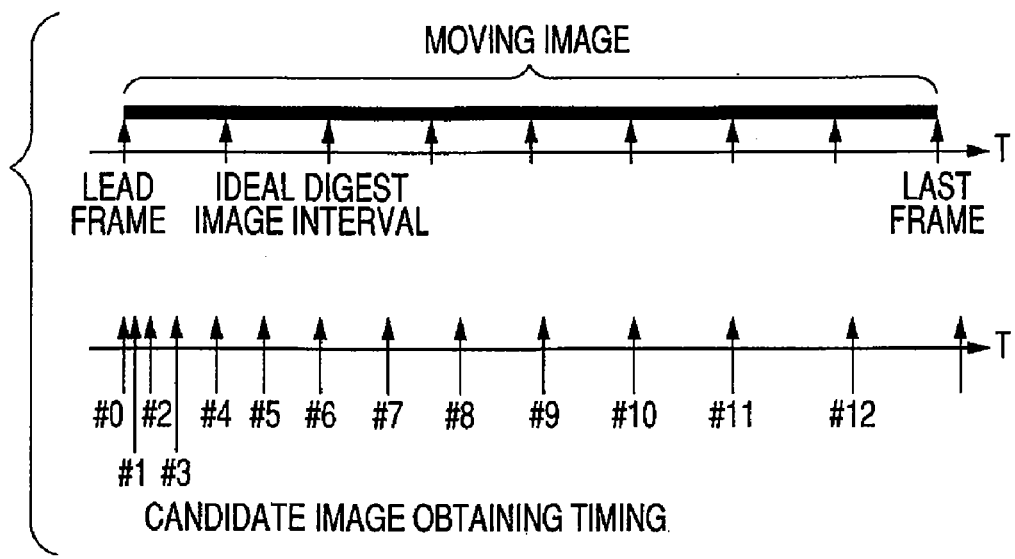
FIG. 17 illustrates a maintenance method of a candidate image.

FIG. 17 shows an operation in which a digest display data candidate image is maintained (Step S1406). In the case where it appears from the following expression that a current moving image frame number is an obtaining timing, the moving image frame is obtained and held as digest image candidate data. In this case, the data held within an ideal digest interval calculated from the current moving image photographing time is discarded since it is verified not to be used even after photographing.

Assuming that the frame number of a first candidate image #0 is #0, and the frame number of a candidate image #n+1 is A·n+candidate image #n−1, the frame number of a candidate image #n is #(?*n*(n−1)).

Figure 18:
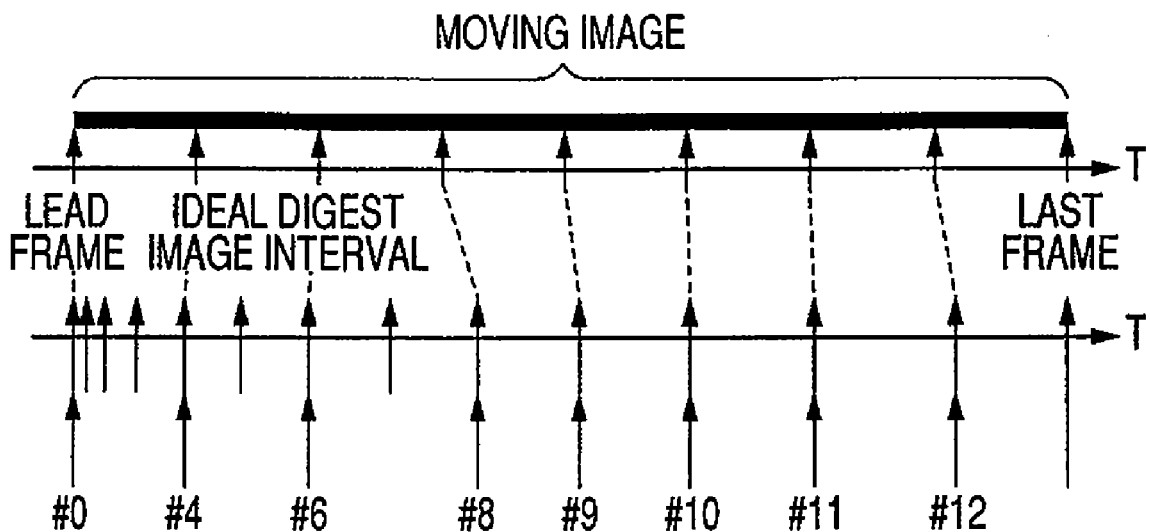
FIG. 18 shows a sequence of creating and writing digest display data (Step S1408)

FIG. 18 shows a digest display data creating and writing sequence (Step S1408). An ideal digest image interval is calculated from a photographing end time, and a candidate image closest to the interval is adopted as digest display data. In the examples of FIG. 18, a lead frame (candidate image #0), a candidate image #4, a candidate image #6, a candidate image #8, a candidate image #9, a candidate image #10, a candidate image #11, and a last frame are adopted as digest display images. The adopted digest display data is written in the same file as that of the moving image reproduction data in the case where it is instructed to be written in the same file as that of the moving image reproduction data by the operation unit 909 (see FIG. 12), and the adopted digest display data is written in a separate file in the case where it is instructed to be written in a separate file (see FIG. 13). Since a moving image photographing time is short, the number of candidate images may be insufficient and selected images may be overlapped. In the case where a moving image photographing time is short, even if the files are globally searched for, a processing time does not become long. Therefore, a digest display data candidate image is obtained from a moving image file to create digest display data.

Third Embodiment

Next, a third embodiment of the present invention will be described. The basic operation is substantially the same as that of the above-mentioned second embodiment, so that only Steps S1406 and S1408 shown in FIG. 14, which are different from those of the second embodiment, will be described.

Figure 19:
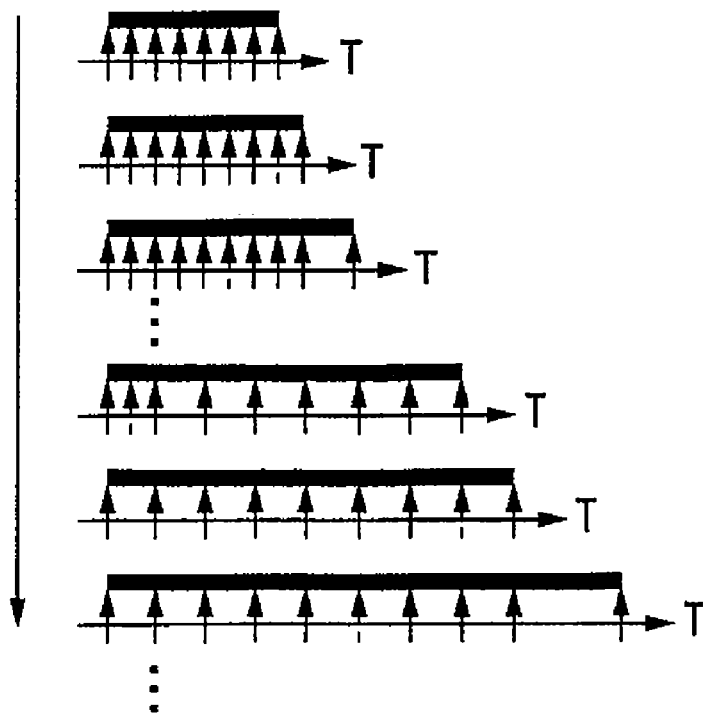
FIG. 19 shows a timing of obtaining a digest display data candidate image (Step S1406 of FIG. 14)

FIG. 19 shows a timing of obtaining a digest display data candidate image (Step S1406 of FIG. 14). Herein, the number of candidate images to be held is set to be 8 as an example.

First, 8 candidate images are obtained at an appropriate equal interval. When the 8th candidate image is obtained, after the 9th candidate image is obtained at the same interval, in a current obtaining stage of a candidate image, candidate images related to both a newest obtaining interval and a second newest obtaining interval among the shortest obtaining intervals are deleted. As described above, after the candidate images are once deleted to enlarge an obtaining interval, candidate images are obtained at a longest obtaining interval in the current obtaining stage of candidate images, and the above-mentioned deletion of candidate images is performed. By repeating such operations, 8 candidate images to be held are retained. Thus, obtaining intervals of candidate images in a front stage and a back stage can be made equal.

Figure 20:
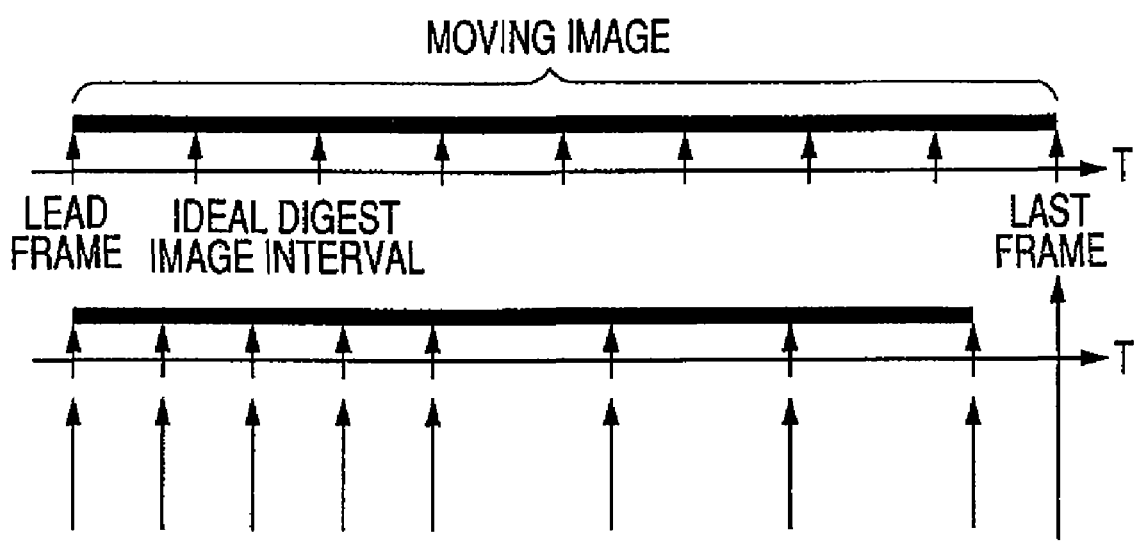
FIG. 20 shows a method of creating digest display data from the obtained candidate image (Step S1408 of FIG. 14)

FIG. 20 shows a method of creating digest display data from obtained candidate images (Step S1408 of FIG. 14.) Herein, the digest display data is composed of 9 images. Digest display data is created using 9 images including 8 held candidate images added to the last frame, and the digest display data is written in the same file as or a separate file from a moving image reproduction file in accordance with the operation unit 909.

Fourth Embodiment

Next, the fourth embodiment of the present invention will be described with reference to FIGS. 19 and 21. The basic operation is substantially the same as that of the above-mentioned third embodiment. Therefore, herein, only Step S1408 of FIG. 14 different from the third embodiment will be described.

Figure 21:
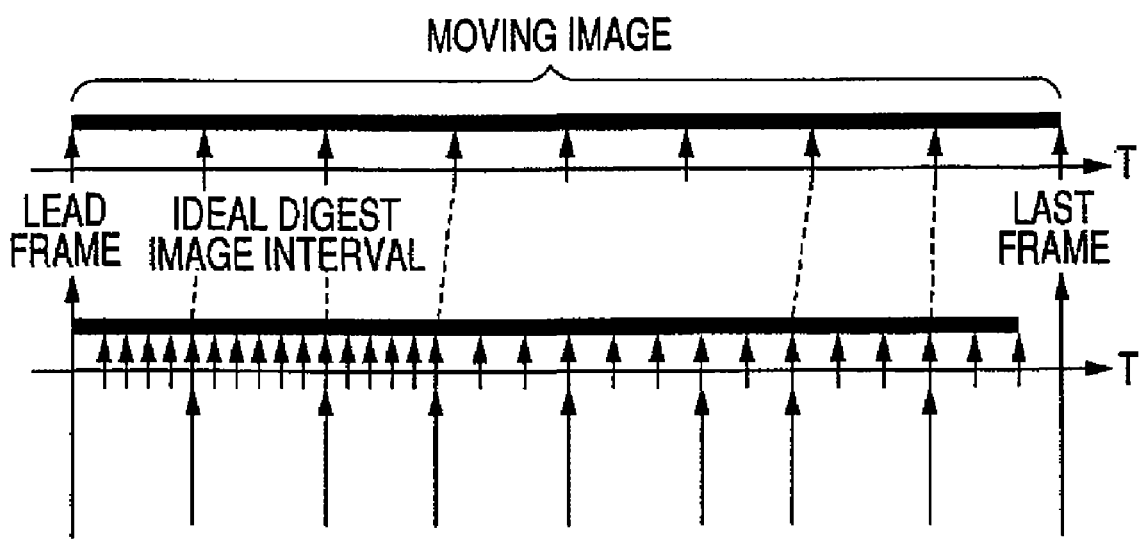
FIG. 21 shows a method of Step S1408 of FIG. 14 of creating digest display data from the obtained candidate image.

FIG. 21 shows a method of Step S1408 of FIG. 14, of creating digest display data from obtained candidate images. Herein, although digest display data is composed of 9 images, the number of held candidate images is 30 (the number of candidate images to be held during photographing is set to be 30).

An ideal digest image interval is calculated from a photographing end time, and candidate images closest to the interval are obtained as digest display data to create digest display data. After this, the digest display data is written in the same file as or a separate file from a moving image reproduction file in accordance with the operation unit 109.

According to the second to fourth embodiments of the present invention, when digest display data is created, it is not necessary to extract a particular frame data from moving image reproduction data, whereby digest display data of the moving image can be created at a high speed.

In the above embodiment, the nonvolatile memory 300 may be composed of a micro-DAT, a magnetooptical disk, an optical disk such as a CD-R or CD-RW, or a phase-change type optical disk such as a DVD, as well as a memory card such as a PCMCIA card or a compact flash™, or a hard disk.

Furthermore, the nonvolatile memory 300 may be a complex medium in which a memory card, a hard disk, and the like are integrated. Furthermore, the nonvolatile memory 300 may have a configuration in which a part of the complex medium can be attachable/detachable thereto/therefrom.

In the above-mentioned embodiment, it is described that the nonvolatile memory 300 is separate from the image reproducing apparatus 100, and can be connected arbitrarily thereto. However, some or all of the recording media may be fixed to the image processing apparatus 100.

Furthermore, needless to say, the object of the present invention can be achieved even by supplying a recording medium storing a program code of software realizing the function of the above-mentioned embodiment in a system or an apparatus, and allowing a computer (or a CPU or an MPU) of the system or the apparatus to read the program code stored in the recording medium for execution.

In this case, the program code itself read from the recording medium realizes the function of the above-mentioned embodiment, and the program code itself and the recording medium storing the program code constitute the present invention.

As the recording medium for supplying a program code, for example, a flexible disk, a hard disk, an optical disk, a magnetooptical disk, a CD-ROM, a CD-R, a magnetic tape, a nonvolatile memory card, or a ROM can be used.

Furthermore, needless to say, by executing the program code read by the computer, the function of the above-mentioned embodiment can to realized, and also an OS (basic system or an operating system) operated on the computer performs partial or entire actual processing in accordance with an instruction of the program code, whereby the function of the above-mentioned embodiment can be realized by that processing.

Furthermore, needless to say, after the program code read from the recording medium is written in a memory provided in a function extension board inserted in a computer or a function extension unit connected to the computer, a CPU or the like provided in the function extension board or the function extension unit performs partial or entire actual processing in accordance with an instruction of the program code, whereby the function of the above-mentioned embodiment can be realized by that processing.

As described above, although the present invention has been described by way of preferable examples, the present invention is not limited to the above examples, and can be variously modified within the scope of claims.

This application claims priority from Japanese Patent Application No 2005-022083 filed on Jan. 28, 2005, which is hereby incorporated by reference herein.

What is claimed is:

1. An image display control apparatus, comprising:
an obtaining unit configured to obtain image data which includes both moving image data and still image data;
an extracting unit configured to extract a plurality of frame data from a single moving image data;
a selecting unit configured to accept selection of image data of an image to be switchably displayed on a display device, from the image data obtained by the obtaining unit; and
a display control unit configured to effect control to switchably display the image on the display device so that when the selected image is still image data, the display device displays a single image based on the selected still image data, and so that when the selected image is moving image data, the display device displays simultaneously a plurality of images based on a plurality of frame data extracted from the selected single moving image data by the extracting unit.

2. An apparatus according to claim 1, further comprising a switching unit configured to, in the case where the moving image data is selected by the selecting unit, switch over a display state on the display device between a display state in which the plurality of frame data are displayed on the display device and another display state.

3. An apparatus according to claim 2, wherein the other display state is a display state in which a first frame data of the moving image data is displayed on the display device.

4. An apparatus according to claim 1, wherein the display control unit displays a part of the plurality of frame data extracted by the extracting unit, on the display device.

5. An apparatus according to claim 1, wherein the moving image data comprises moving image reproduction data, and the plurality of frame data extracted by the extracting unit is further recorded together with the moving image reproduction data.

6. An apparatus according to claim 5, wherein the plurality of frame data are recorded at a reading position before the moving image reproduction data.

7. An apparatus according to claim 1, wherein the moving image data comprises moving image reproduction data, and the plurality of frame data extracted by the extracting unit are recorded in a file different from that of the moving image data.

8. An apparatus according to claim 1, further comprising a recording unit configured to record at least one image data.

9. An apparatus according claim 8, wherein the extracting unit performs an extraction operation of extracting the plurality of frame data from the single moving image data while performing a recording operation of the moving image data onto the recording unit.

10. An apparatus according to claim 8, wherein the extracting unit varies an extraction interval of the plurality of frame data in accordance with an elapsed time of recording the moving image data onto the recording unit.

11. An apparatus according to claim 10, wherein the extracting unit enlarges an extraction interval of the plurality of frame data in accordance with the elapsed time of recording the moving image data onto the recording unit.

12. An apparatus according to claim 10, wherein the extracting unit enlarges an extraction interval while keeping an extraction number of the plurality of frame data constant, in accordance with the elapsed time of recording the moving image data onto the recording unit.

13. An image display control method, comprising:
- an obtaining step of obtaining image data which includes both moving image data and still image data;
- an extraction step of extracting a plurality of frame data from a single moving image data;
- a selecting step accepting selection of image data of an image to be switchably displayed on a display device, from the image data obtained in the obtaining step; and
- a display control step of effecting control to switchably display the image on the display device so that when the selected image is still image data, the display device displays a single image based on the selected still image data, and so that when the selected image is moving image data, the display device displays simultaneously a plurality of images based on a plurality of frame data extracted from the selected single moving image data in the extracting step.

14. A computer-readable recording medium which stores a computer-executable program for causing a computer to execute the image processing method set out in claim 13.

* * * * *